(12) United States Patent
Hautala (10) Patent No.: US 9,313,309 B2
(45) Date of Patent: Apr. 12, 2016

(54) ACCESS TO CONTACTS (75) Inventor: Ismo Tapio Hautala, Espoo (FI)

(73) Assignee: Nokia Technologies Oy, Espoo (FI)

( * ) Notice: Subject to any disclaimer, the term of this patent is extended or adjusted under 35 U.S.C. 154(b) by 472 days.

(21) Appl. No.: 12/332,846

(22) Filed: Dec. 11, 2008

(65) Prior Publication Data

US 2010/0153886 A1 Jun. 17, 2010

(51) Int. Cl.
 *G06F 3/048* (2013.01)
 *H04M 1/2745* (2006.01)
 *G06F 3/0482* (2013.01)
 *H04M 1/725* (2006.01)

(52) U.S. Cl.
 CPC ......... *H04M 1/27455* (2013.01); *G06F 3/0482* (2013.01); *H04M 1/72586* (2013.01); *H04M 2250/22* (2013.01)

(58) Field of Classification Search
 USPC .......................................... 715/735, 815, 810
 See application file for complete search history.

(56) References Cited

U.S. PATENT DOCUMENTS

| | | | |
|---|---|---|---|
| 5,793,365 A * | 8/1998 | Tang et al. | 715/758 |
| 6,459,440 B1 | 10/2002 | Monnes et al. | 345/808 |
| 6,980,813 B2 * | 12/2005 | Mohi et al. | 455/456.1 |
| 7,685,530 B2 * | 3/2010 | Sherrard et al. | 715/764 |
| 2004/0100497 A1 | 5/2004 | Quillen et al. | |
| 2004/0119758 A1 | 6/2004 | Grossman et al. | |
| 2004/0243941 A1 | 12/2004 | Fish | |
| 2005/0091272 A1 * | 4/2005 | Smith et al. | 707/104.1 |
| 2005/0143135 A1 * | 6/2005 | Brems et al. | 455/564 |
| 2005/0172001 A1 * | 8/2005 | Zaner et al. | 709/205 |
| 2007/0035513 A1 | 2/2007 | Sherrard et al. | |
| 2008/0046478 A1 * | 2/2008 | Mandre et al. | 707/201 |
| 2008/0059627 A1 | 3/2008 | Hamalainen et al. | |
| 2008/0282158 A1 | 11/2008 | Aaltonen et al. | |
| 2009/0098911 A1 * | 4/2009 | Kim et al. | 455/566 |
| 2009/0186605 A1 * | 7/2009 | Apfel et al. | 455/416 |

FOREIGN PATENT DOCUMENTS

| | | |
|---|---|---|
| CN | 1524387 A | 8/2004 |
| WO | WO02082343 | 10/2002 |
| WO | WO-2007-008321 A2 | 1/2007 |

OTHER PUBLICATIONS

International Search Report and Written Opinion dated Mar. 23, 2010 from PCT Application No. PCT/FI2009/050985, 14 pages.

* cited by examiner

*Primary Examiner* — William Trapanese
(74) *Attorney, Agent, or Firm* — Harrington & Smith (57) ABSTRACT

A user interface comprises a display and a controller, said controller being arranged to display an arrangement of at least one contact icon associated with a contact and to display a control icon, said control icon associated with a function.

28 Claims, 4 Drawing Sheets

ACCESS TO CONTACTS

FIELD

The present application relates to a user interface, a device and a method for improved access to contacts, and in particular to a user interface, a device and a method for improved access to contacts and groups stored in a device.

BACKGROUND

More and more electronic devices such as mobile phones, MP3 players, Personal Digital Assistants (PDAs) are becoming smaller and smaller while having more and more information stored and/or accessible through them. Users are relying on these devices and becoming all the more dependant on them. The environments in which these devices are used are also becoming more and more hectic with higher demands on fast access and multitasking, and not only in a professional environment but also in private and social environments.

A device that allows fast and easy access to the contacts stored or accessible through the device or user interface would thus be useful in modern day society

SUMMARY

On this background, it would be advantageous to provide a user interface, a device and a method that overcomes or at least reduces the drawbacks indicated above by providing a device having an improved access to the contacts according to the claims.

It is an object of this application to provide easy access to contacts and functions related to the contacts or vice versa, that is to allow easy access to contacts from applications, in a manner that is easy and intuitive to use and learn and which employs a graphical visualization that purports the underlying functionality.

Further objects, features, advantages and properties of device, method and computer readable medium according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which.

DETAILED DESCRIPTION

In the following detailed description, the user interface, the device, the method and the software product according to the teachings for this application in the form of a cellular/mobile phone will be described by the embodiments. It should be noted that although only a mobile phone is described the teachings of this application can also be used in any electronic device such as in portable electronic devices such as laptops, PDAs, mobile communication terminals, electronic books and notepads and other electronic devices offering access to information.

Figure 1:
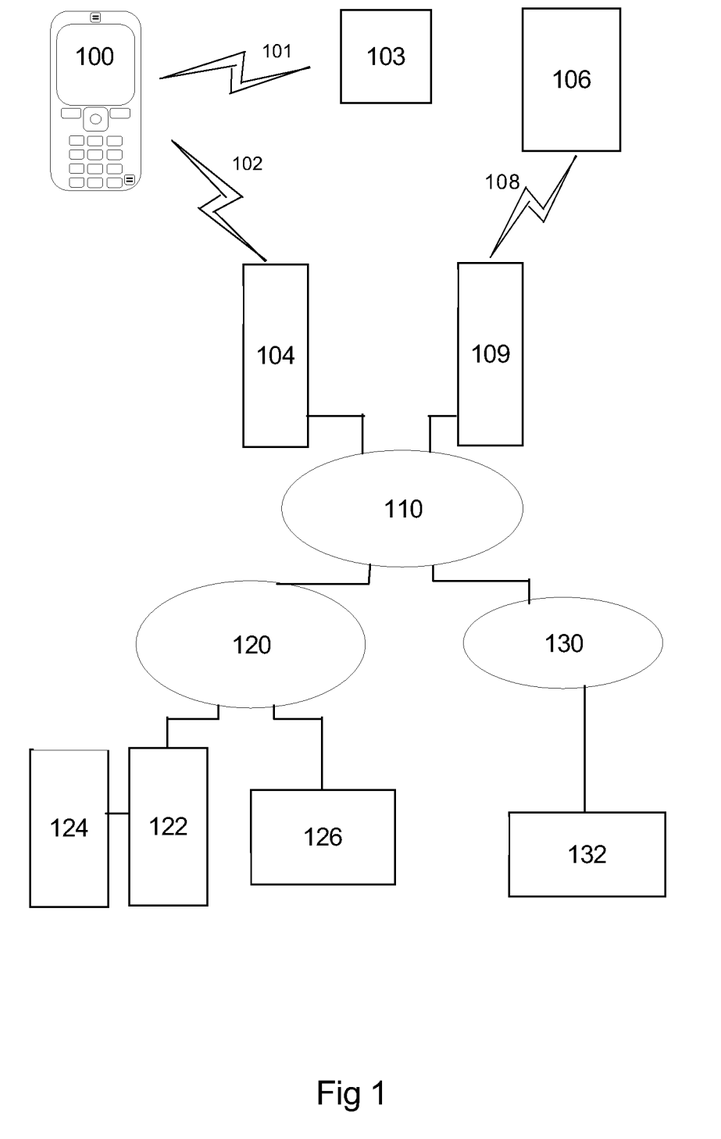
FIG. 1 is an overview of a telecommunications system in which a device according to the present application is used according to an embodiment.

FIG. 1 illustrates an example of a cellular telecommunications system in which the teachings of the present application may be applied. In the telecommunication system of FIG. 1, various telecommunications services such as cellular voice calls, www or Wireless Application Protocol (WAP) browsing, cellular video calls, data calls, facsimile transmissions, music transmissions, still image transmissions, video transmissions, electronic message transmissions and electronic commerce may be performed between a mobile terminal 100 according to the teachings of the present application and other devices, such as another mobile terminal 106 or a stationary telephone 132. It is to be noted that for different embodiments of the mobile terminal 100 and in different situations, different ones of the telecommunications services referred to above may or may not be available; the teachings of the present application are not limited to any particular set of services in this respect.

The mobile terminals 100, 106 are connected to a mobile telecommunications network 110 through Radio Frequency, RF links 102, 108 via base stations 104, 109. The mobile telecommunications network 110 may be in compliance with any commercially available mobile telecommunications standard, such as Group Spéciale Mobile, GSM, Universal Mobile Telecommunications System, UMTS, Digital Advanced Mobile Phone system, D-AMPS, The code division multiple access standards CDMA and CDMA2000, Freedom Of Mobile Access, FOMA, and Time Division-Synchronous Code Division Multiple Access, TD-SCDMA.

The mobile telecommunications network 110 is operatively connected to a wide area network 120, which may be Internet or a part thereof. An Internet server 122 has a data storage 124 and is connected to the wide area network 120, as is an Internet client computer 126. The server 122 may host a www/wap server capable of serving www/wap content to the mobile terminal 100.

A public switched telephone network (PSTN) 130 is connected to the mobile telecommunications network 110 in a familiar manner. Various telephone terminals, including the stationary telephone 132, are connected to the PSTN 130.

The mobile terminal 100 is also capable of communicating locally via a local link 101 to one or more local devices 103. The local link can be any type of link with a limited range, such as Bluetooth, a Universal Serial Bus (USB) link, a Wireless Universal Serial Bus (WUSB) link, an IEEE 802.11 wireless local area network link, a Radio Standard link for example an RS-232 serial link, etc. The local devices 103 can for example be various sensors that can communicate measurement values to the mobile terminal 100 over the local link 101.

Figure 2:
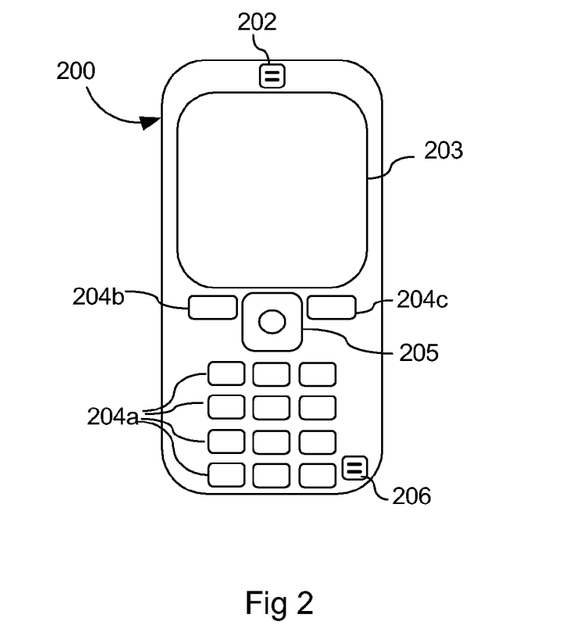
FIG. 2 is a planar front view of a device according to an embodiment.

An embodiment 200 of the mobile terminal 100 is illustrated in more detail in FIG. 2. The mobile terminal 200 comprises a speaker or earphone 202, a microphone 206, a main or first display 203 and a set of keys 204 which may include a keypad 204a of common ITU-T type (alpha-numerical keypad representing characters "0"-"9", "*" and "#") and certain other keys such as soft keys 204b, 204c and a joystick 205 or other type of navigational input device.

Figure 3:
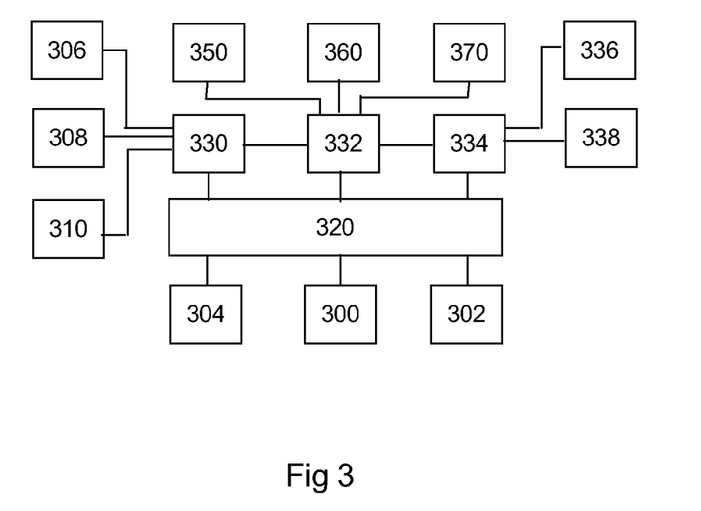
FIG. 3 is a block diagram illustrating the general architecture of a device of FIG. 2 in accordance with the present application.

The internal component, software and protocol structure of the mobile terminal 200 will now be described with reference to FIG. 3. The mobile terminal has a controller 300 which is responsible for the overall operation of the mobile terminal and may be implemented by any commercially available CPU ("Central Processing Unit"), DSP ("Digital Signal Processor") or any other electronic programmable logic device. The controller 300 has associated electronic memory 302 such as Random Access Memory (RAM) memory, Read Only memory (ROM) memory, Electrically Erasable Programmable Read-Only Memory (EEPROM) memory, flash memory, or any combination thereof. The memory 302 is used for various purposes by the controller 300, one of them being for storing data used by and program instructions for various software in the mobile terminal. The software includes a real-time operating system 320, drivers for a man-machine interface (MMI) 334, an application handler 332 as well as various applications. The applications can include a phonebook application 350, a notepad application 360, as well as various other applications 370, such as applications for voice calling, video calling, sending and receiving Short Message Service (SMS) messages, Multimedia Message Service (MMS) messages or email, web browsing, an instant messaging application, message text editor application, a calendar application, a control panel application, a camera application, one or more video games, a notepad application, etc. It should be noted that two or more of the applications listed above may be executed as the same application The MMI 334 also includes one or more hardware controllers, which together with the MMI drivers cooperate with the first display 336/203, and the keypad 338/204 as well as various other Input/Output devices such as microphone, speaker, vibrator, ringtone generator, LED indicator, etc. As is commonly known, the user may operate the mobile terminal through the man-machine interface thus formed.

The software also includes various modules, protocol stacks, drivers, etc., which are commonly designated as 330 and which provide communication services (such as transport, network and connectivity) for an RF interface 306, and optionally a Bluetooth interface 308 and/or an IrDA interface 310 for local connectivity. The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, band pass filters, amplifiers, mixers, local oscillators, low pass filters, Analog to Digital and Digital to Analog (AD/DA) converters, etc.

The memory 302 is one example of a computer readable medium. Other examples of computer readable mediums are diskettes, CD-ROMs (Compact Disc ROMS), DVDs (Digital Video Discs), Universal Serial Bus (USB) memory sticks, and memory cards such as Secure Digital (SD) memory cards. A computer readable medium can also be at least a portion of a storage device such as a hard drive or other used in a server for storing software to be downloaded to a client.

The mobile terminal also has a Subscriber Identity Module (SIM) card 304 and an associated reader. As is commonly known, the SIM card 304 comprises a processor as well as local work and data memory.

Figure 4:
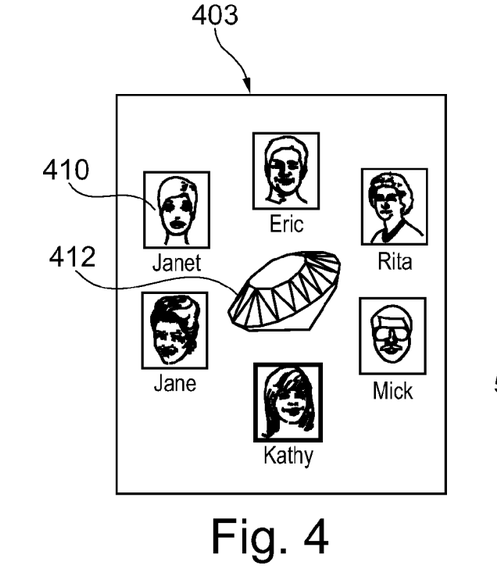
FIG. 4 is a screen shot view of a device according to an embodiment.

FIG. 4 shows a screen shot view 403 of a device (200) which in this embodiment is a mobile device but can be any electronic device as discussed above.

A number of icons 410 representing each a contact stored in a memory (302) for use with for example a phonebook application (350) is displayed on the display (403) visible in this screen shot. In this embodiment the number of icons 410 shown is 6, but any number would be plausible and the number of contacts shown can be dependant on display size, number of contacts stored or the number of contacts repeatedly or most frequently used or accessed. In various embodiments anywhere from four through twelve contacts may be shown.

In this embodiment each contact icon 410 is visually displayed as a picture of the contact with the contacts name displayed under it. It should be noted that any combination of the contact information including pictures may be used as the representing icon. Other plausible icons representations are trademarks associated with the contact.

In one embodiment each icon 410 may represent a group of contacts.

A controller (300) is configured to receive user input through a navigation key (205) for alternatively selecting or highlighting an icon 410.

It should be noted that even if the description below is given with references to a physical keypad the teachings of this application may just as well be implemented with touch sensitive input means such as a touch display and/or a touch pad.

Upon marking or highlighting an icon 410 the contact represented with the icon 410 is selectable for further actions or options such as initiating a call to the contact, starting a text editor for composing a text message to the contact, launching an instant messaging application for setting up a chat session with the contact or any other action associated with the contact. A contact is selected by marking it and then pressing a select key. In one embodiment the select key is the middle key of the navigation key (25) and in one embodiment it is a softkey (204b, c).

In one embodiment the contacts displayed are dynamic and change upon content and/or access to said contact.

Also displayed and visible in this screen shot view 403 is a control icon 412. This control icon 412 may also be selected and upon selection an associated function is executed by the controller.

In one embodiment the control icon 412 may represent a contact group, i.e. a list of contacts. In one embodiment the contacts are belonging to this group are represented by the contact icons 410 surrounding the control icon 412. In one embodiment only the most recently contacted contacts are represented. In one embodiment only a portion of the contacts belonging to the group are represented.

In one embodiment where the control icon 412 represents a group a group of a user's most important people (i.e. persons that are contacted often and/or need to be able to be contacted quickly) and they are gathered around the a diamond symbol representing the control icon 412. This symbol representing the control icon could also be a football, a golf bat, an image of a cat, a face or any other symbol which represents a group for the user. Thus, any action that can be done on an individual contact may also be done on the whole group very easily by highlighting the control icon 412 and activate a function that will be applied to all contacts belonging to the group being represented by the control icon 412.

In FIG. 4 the control icon 412 is arranged in the middle of a circle made up of the contact icons 410. This provides a visual indication of an intuitive linking or association of the control icon 412 to the contacts and a user is thereby intuitively made aware of the connection of the control icon and the contacts making it highly intuitive and easy to learn and to use the control icon 412.

In one embodiment the associated function is to change the displayed contact icons 410 to another group of contact icons 410.

In one embodiment the associated function is to update the icons 410 displayed to represent the most frequently accessed contacts or groups.

In one embodiment the associated function is to select the icons currently being marked or highlighted.

In one embodiment the associated function is to execute a function associated with a contact being represented by an icon 410. Examples of such functions are to establish a call, start to compose a message to the contact or other functions available for the contact.

In one embodiment the controller (300) is configured to receive user input through a navigation key (205) for alternatively selecting or highlighting an icon 410 or the control icon 412.

In one embodiment the selected or highlighted icon is brought into focus by rotating the ring of icons 410.

Figure 5:
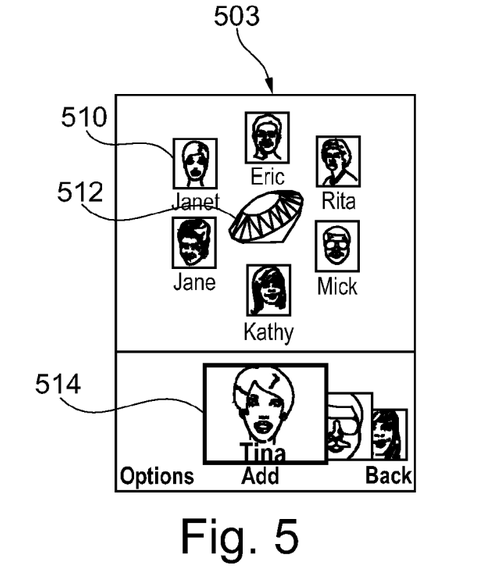
FIG. 5 is a screen shot view of a device according to an embodiment.

For example: If the current focus is on Kathy, and a user clicks the joystick or navigation key "right", the contacts around the control icon 412 rotate on the display 403 clockwise so that Mick comes to the place of focus. This way the user has the opportunity to either rotate the contact icon ring clockwise or anti-clockwise by clicking the joystick left or right, or to move the focus upwards to the control icon 412 (and also downwards to the bottom-row as shown in FIG. 5). In FIG. 4, this enables the user to select either one member of the group or the group symbol represented by the control icon 412.

An example action is a voice call: If the user focuses a member of the group and presses the a key associated with activating a call (such as the green key on Nokia™ mobile phones) on the phone, a voice call is initiated with that specific member. If the user focuses the group symbol and presses the Green key a voice conference is established between all the members of the group. Instead of calling, any other function may be initiated. Calling is just an example.

In one embodiment each contact may have a preferred action associated with it, which action is executed upon selection of the control icon 412 when the icon 410 representing a contact is marked.

The arrangement of the contact icons 410 and the control icon 412 is displayed in an idle mode of the user interface in one embodiment.

In another embodiment the arrangement 410+412 is displayed as a controller receives a specific input, such as through a specific key 204 or through the navigation key 205 being pressed in a certain direction, for example up, down, left or right.

In one embodiment the controller (300) is further arranged to receive an input implicating that the full list of contacts should be shown. In one embodiment such input is to press a select key.

In one embodiment where the arrangement 410+412 is displayed after receipt of a specific input, repeating that input may display the full list of contacts.

FIG. 5 shows another screen shot view 503. In this screen shot view both the arrangement of contact icons 510 and the control icon 512 is shown along with a scrollable list representation of the full list contact. The list is in this embodiment made up of icons 514 representing each contact. And in this embodiment the icons 514 are pictures of the contacts. It should be noted that any information associated with the contact may be used as an icon 514.

In the embodiment shown in FIG. 5 the arrangement 510+512 is displayed in an upper portion of a display (203) and the full list of contacts is shown in a lower portion of the display (203). However it should be noted that the arrangement 510+512 and the list 514 can be arranged in other layouts as well depending on cultural influences and display size.

In one embodiment the control icon 512, 412 is in the form of a graphical object. In the examples shown the graphical object is in the form of a diamond. However, in alternative embodiments the control icon 512 may be an icon representing the associated function. For example as an icon 410, 510 representing a contact for which the associated function is to establish a voice call, the control icon 412, 512 may be represented as a picture of a phone or as an icon 410, 510 representing a contact for which the associated function is to compose and send a text message, the control icon 412, 512 may be represented as an envelope picture.

In one embodiment (not shown) the control icon (412) is represented by the image to be sent and icons (410) representing the recipients are arranged around the control icon (412). Actions can then be made to either a recipient solely or to the whole recipient list by either selecting a contact icon (for an individual contact) or the control icon (for the whole list). An example of a function to be applied to a single recipient is to edit the telephone number. An example of a function to be applied to the whole list is to send the message.

Figure 6:
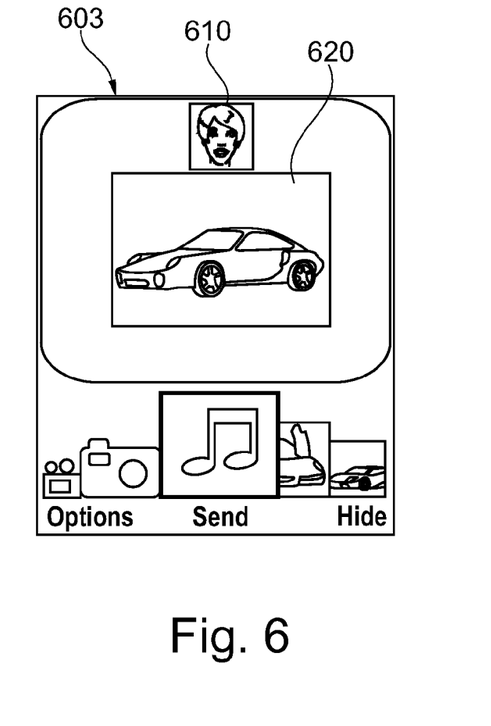
FIG. 6 is a screen shot view of a device according to an embodiment.

In one embodiment a controller is arranged to display the arrangement 410+412 (510+512) upon receipt of a specific input as also discussed above. In one embodiment the input may be a press on an up key or by a specific gesture for example an upwards swipe if touch input means are employed. In one embodiment the controller is arranged to display the arrangement irrespective of the current mode of operation when detecting or receiving the specific input. If for example a gallery application is currently being executed and the controller receives the specific input to display the arrangement 410+412 (510+512) the control icon 412 (512) would be associated with associating the currently selected gallery item with a contact also selected (or to be selected). FIG. 6 shows a screen shot view 603 in which a gallery item 620 is displayed and a contact to which the gallery item will be communicated to has been selected and an icon 610 representing this contact is displayed. The gallery item is in one embodiment a control icon. Should several contacts be selected their associated icons are arranged in a circular pattern around the gallery or control item.

In one embodiment the arrangement 410+412 (510+512) is displayed as a contact is to be selected for an application currently being executed by the controller. For example as a text editor application is being executed and a recipient of the message being input is to be selected the arrangement 410+412 (510+512) is displayed.

As discussed for the embodiments above the controller may be arranged to display a full list of contacts 514 upon receipt of (further) specific input.

It should be noted that the full list of contacts need not be displayed in full, but only a portion of it is displayed at a time and the other portions are scrolled to upon user input.

Figure 7A:
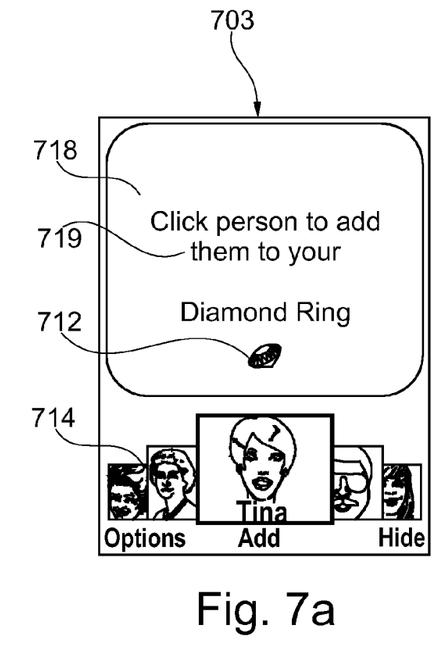
FIGS. 7a, 7b and 7c are screen shot views of a device according to an embodiment.
Figure 7B:
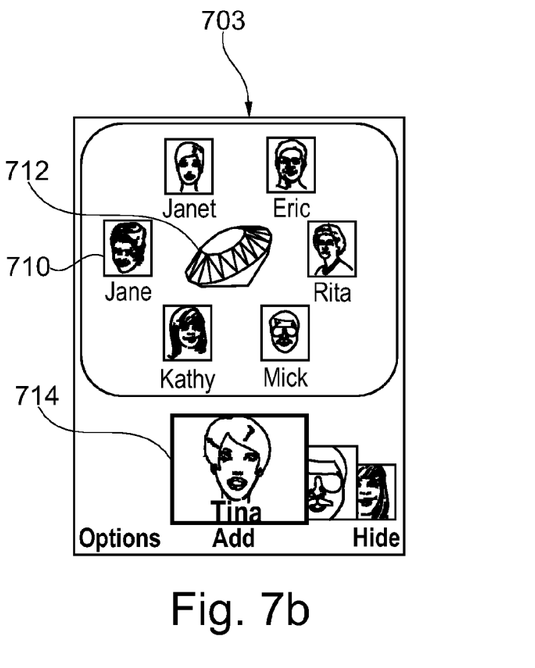

In one embodiment contacts are added to be associated with the icon arrangement 410 by individually selecting them from the full list of contacts. In one embodiment illustrated in FIGS. 7a and 7b which show screen shot views 703 of an empty icon arrangement with only a control icon 712 in FIG. 7a with a full list of contacts 714 displayed under the display portion 718 where the arrangement 710+712 will be displayed. In this display portion 718 an informative text 719 is displayed. As a user selects contacts from the full list of contacts 714 a controller is arranged to create icons 710 representing these contacts and add them to the arrangement 710+712 as is shown in FIG. 7*b*.

In one embodiment the controller (300) is arranged to upon receipt of the specific input while a call or other communication is in session display the arrangement 410+412 and upon user selection of a contact to add that contact to the communication session by opening a communication channel to that contact too.

Figure 8:
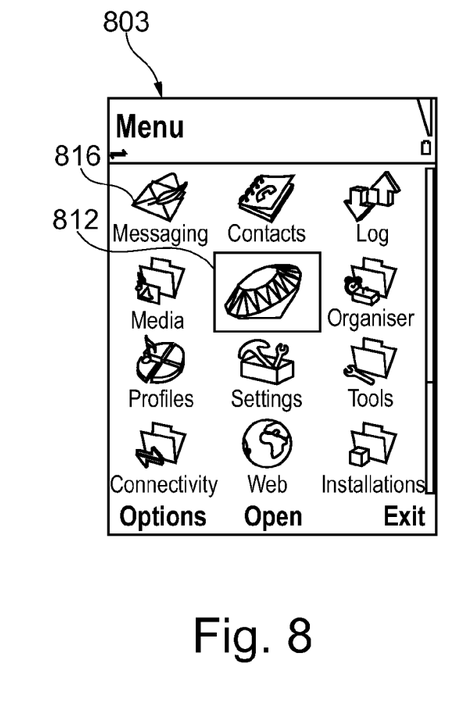
FIG. 8 is a screen shot view of a device according to an embodiment.

FIG. 8 shows another screen shot view 803. In this screen shot view 803 an array of application icons 816 are displayed on the display (203). One of these application icons is an icon 812 representing the control icon (412, 512) and upon selection of this icon 812 the arrangement 410+412 (510+512) is displayed.

In one embodiment several control icons may be available each represented by a different graphical symbol. In one embodiment these graphical images are of different gem stones, like rubies, topaz, diamonds etc. Each control icon is associated with a specific function or group of functions. In one embodiment each control icon is associated with a specific group of contacts. This enables a user to efficiently select a different contact database by simply selecting the corresponding control icon to be used. A controller is in one embodiment arranged to display a list of control icons upon receipt of a specific input as the control icon currently being shown is marked.

In one embodiment the control icons visual representation is representative of a feature associating the contacts being displayed in the arrangement with each other. For example for an arrangement showing contacts that missed calls have been received from the control icon may be a bent arrow. For an arrangement showing contacts that text messages have been received from the control icon may be an envelope. For an arrangement showing contacts that have been recently communicated with the control icon may be a double ended arrow.

In one embodiment (not shown) the controller is arranged to receive navigation commands and to navigate between the full contact list, the individual contacts, the groups of contacts and the control icon(s) accordingly. For example, assuming that the current view is that of FIG. 5 or 7*b* and the control icon 712 is currently focused a down command would shift focus to the full list. An up command would result in a view of a list of other control icons. A sideways command would navigate among the contacts. An up command following such contact navigation would shift focus to the group that the contact belongs to (if any). In one embodiment the available groups are listed in a list being displayed instead of the arrangement or in alternative embodiments instead of the full list or adjacent the arrangement.

Figure 7C:
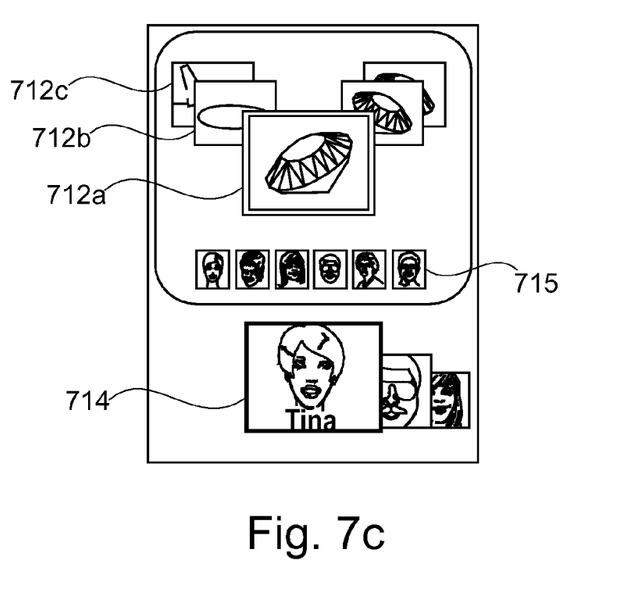

In one embodiment a plurality of control icons 712*a*-*c* are displayed for user selection in either a list or a ring. The control icon 712*a* currently in focus is then the control icon 712*a* currently active and any action taken such as adding a contact to a group will be done for the group represented by the control icon 712*a*.

In one embodiment a list of contacts are shown on the bottom of the display or along any other side depending on design choice. Any contact selected form this list 714 is added to the group represented by the control icon 712*a*.

In one embodiment a list of the contacts 715 that belong to a group being represented by a control icon 712 is shown under the control icon 712*a* instead of as a ring around the control icon 712*a* to save display space for the list or ring of other control icons 712*a* and 712*b*, see FIG. 7*c*.

Figure 9:
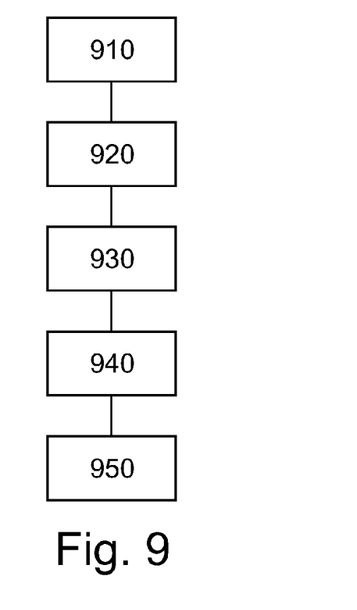
FIG. 9 is a flow chart describing a method according to an embodiment of the application.

FIG. 9 is a flowchart describing a method according to the teachings herein. In a first step 910 a specific input is received by a controller. In response there to the controller is arranged to display an arrangement of icons representing contacts and a control icon in a second step 920. The controller is further arranged to receive navigational input in a third step 930 navigating among the displayed icons. If touch input means are used the navigational input is represented by the touch input. In a fourth step 940 a select input is received of said control icon and the controller is arranged to in response thereto execute a function associated with the control icon in a step 950.

The various aspects of what is described above can be used alone or in various combinations. The teaching of this application may be implemented by a combination of hardware and software, but can also be implemented in hardware or software. The teaching of this application can also be embodied as computer readable code on a computer readable medium. It should be noted that the teaching of this application is not limited to the use in mobile communication terminals such as mobile phones, but can be equally well applied in Personal digital Assistants (PDAs), game consoles, MP3 players, personal organizers or any other device designed for providing information while maintaining low power consumption.

The teaching of the present application has numerous advantages. Different embodiments or implementations may yield one or more of the following advantages. It should be noted that this is not an exhaustive list and there may be other advantages which are not described herein. For example, one advantage of the teaching of this application is that a user interface allows a fast and easy access to contacts and functions associate with said contacts in a manner that is easy to learn and intuitive to use.

Although the teaching of the present application has been described in detail for purpose of illustration, it is understood that such detail is solely for that purpose, and variations can be made therein by those skilled in the art without departing from the scope of the teaching of this application.

For example, although the teaching of the present application has been described in terms of a mobile phone, it should be appreciated that the teachings of the present application may also be applied to other types of electronic devices, such as music players, palmtop computers and the like. It should also be noted that there are many alternative ways of implementing the methods and apparatuses of the teachings of the present application.

Features described in the preceding description may be used in combinations other than the combinations explicitly described.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The term "comprising" as used in the claims does not exclude other elements or steps. The term "a" or "an" as used in the claims does not exclude a plurality. A unit or other means may fulfill the functions of several units or means recited in the claims.

The invention claimed is:

1. A user interface comprising:
a display; and
a controller configured to display an arrangement comprising two or more contact icons, each of the contact icons being associated with a contact and a control icon, said control icon being associated with a function, wherein all contact icons displayed in the arrangement belong to a group of contacts being represented by the control icon displayed in said arrangement, wherein all contacts belonging to the group of contacts represented by the control icon displayed in the arrangement are selectable for said function by marking or highlighting the control icon, and wherein the control icon is configured to change the displayed the group of contact to another group of contacts comprising contact icons.

2. A user interface according to claim 1, wherein said controller is arranged to execute said function upon receiving input representing a selection of said control icon.

3. A user interface according to claim 1, wherein said controller is arranged to display said arrangement upon receipt of a specific input.

4. A user interface according to claim 3, wherein said specific input is a keypress or a gesture on a touchpad or touch display.

5. A user interface according to claim 3, wherein said controller is arranged to display said arrangement irrespective of a current operating mode.

6. A user interface according to claim 1, wherein said controller is arranged to display a list of a plurality of contacts upon receipt of a second specific input.

7. A user interface according to claim 6, wherein said controller is arranged to display said list of a plurality of contacts simultaneously with the arrangement.

8. A user interface according to claim 1, wherein said function associated with said control icon is related to a contact associated with a marked contact icon.

9. A user interface according to claim 1, wherein said function associated with said control icon is related to an operating mode.

10. A user interface according to claim 9, wherein said operating mode is dependent on a currently executed application and wherein said function is related to said application.

11. A user interface according to claim 6, wherein said controller is arranged to receive input representing a selection of a contact from the list of plurality of contacts and in response thereto add an icon representing said selected contact to the arrangement of contact icons and the control icon.

12. A user interface according to claim 1, wherein at least one of said contact icons is associated with a group of contacts.

13. A method comprising:
displaying an arrangement comprising two or more contact icons, each of the contact icons being associated with a contact; and
displaying a control icon belonging to the arrangement, said control icon being associated with a function, wherein all contact icons displayed in the arrangement belong to a group of contacts being represented by the control icon displayed in said arrangement, wherein all contacts belonging to the group of contacts represented by the control icon displayed in the arrangement are selectable for said function by marking or highlighting the control icon, for allowing access to contacts, and wherein the control icon is configured to change the displayed group of contact to another group of contacts comprising contact icons.

14. A method according to claim 13, further comprising executing said function upon receiving input representing a selection of said control icon.

15. A method according to claim 13, further comprising displaying said arrangement upon receipt of a specific input.

16. A method according to claim 15, wherein said specific input is a keypress or a gesture on a touchpad or touch display.

17. A method according to claim 15, further comprising displaying said arrangement irrespective of a current operating mode.

18. A method according to claim 13, further comprising displaying a list of a plurality of contacts upon receipt of a second specific input.

19. A method according to claim 18, further comprising displaying said list of a plurality of contacts simultaneously with the arrangement.

20. A method according to claim 13, wherein said function associated with said control icon is related to a contact associated with a marked contact icon.

21. A method according to claim 13, wherein said function associated with said control icon is related to an operating mode.

22. A method according to claim 21, wherein said operating mode is dependent on a currently executed application and wherein said function is related to said application.

23. A method according to claim 18, further comprising receiving input representing a selection of a contact from the list of plurality of contacts and in response thereto adding an icon representing said selected contact to the arrangement of contact icons and the control icon.

24. A method according to claim 13, wherein at least one of said contact icons is associated with a group of contacts.

25. A non-transitory computer readable medium comprising a computer executable program configured to execute, when the computer executable program is run in a controller, a method comprising displaying an arrangement comprising two or more contact icons, each of the contact icons being associated with a contact and a control icon, said control icon being associated with a function, wherein all contact icons displayed in the arrangement belong to a group of contacts being represented by the control icon displayed in said arrangement, wherein all contacts belonging to the group of contacts represented by the control icon displayed in the arrangement are selectable for said function by marking or highlighting the control icon, and wherein the control icon is configured to change the displayed the group of contact to another group of contacts comprising contact icons.

26. An apparatus comprising or arranged to comprise a user interface according to claim 1.

27. An apparatus comprising:
at least one controller; and
at least one memory including computer program code, the at least one memory and the computer program code configured to, with the at least one controller, cause the apparatus at least to:
display an arrangement comprising two or more contact icons, each of the contact icons being associated with a contact; and
display a control icon belonging to the arrangement, said control icon being associated with a function, wherein all contact icons displayed in the arrangement belong to a group of contacts being represented by the control icon displayed in said arrangement, wherein all contacts belonging to the group of contacts represented by the control icon displayed in the arrangement are selectable for said function by marking or highlighting the control icon, and wherein the control icon is configured to change the displayed the group of contact to another group of contacts comprising contact icons.

28. An apparatus implementing or arranged to implement a non-transitory computer readable medium according to claim 25.

* * * * *